W. S. TEEPLE.
GLASS FORMING MACHINE.
APPLICATION FILED NOV. 7, 1913.

1,154,894.  Patented Sept. 28, 1915.
7 SHEETS—SHEET 3.

W. S. TEEPLE.
GLASS FORMING MACHINE.
APPLICATION FILED NOV. 7, 1913.

1,154,894.

Patented Sept. 28, 1915.
7 SHEETS—SHEET 5.

WITNESSES:

INVENTOR
William S. Teeple
by Christy and Christy
Att'ys

UNITED STATES PATENT OFFICE.

WILLIAM S. TEEPLE, OF WELLSBURG, WEST VIRGINIA.

GLASS-FORMING MACHINE.

1,154,894.  Specification of Letters Patent.  Patented Sept. 28, 1915.

Application filed November 7, 1913. Serial No. 799,724.

*To all whom it may concern:*

Be it known that I, WILLIAM S. TEEPLE, residing at Wellsburg, in the county of Brooke and State of West Virginia, a citizen of the United States, have invented or discovered certain new and useful Improvements in Glass-Forming Machines, of which improvements the following is a specification.

My invention relates to glass shaping machines wherein a rotatable table is provided with a plurality of molds adapted to successively receive predetermined quantities of molten glass, each mold, through the movement of the table, being carried to successive stations at which the glass is shaped and the blank or formed article removed. Automatic machines for this purpose have been constructed wherein means are provided to cut the molten glass as it flows from a gathering or feeding device, the operation of such cutting means, or the means for setting such cutting means into operation, being effective to set into motion instrumentalities to move the molds from one station to another and for shaping the molten glass in the desired manner.

It is the object of my invention to simplify the construction of such automatic machines, and to provide them with means for improving their intended operation and rendering them more efficient.

In the illustrative embodiment of my invention I show a machine for forming blanks adapted to be subsequently blown into bottles, and in the general views of the machine a blowing table is also shown, although it forms no part of my present invention. It will be apparent, however, to those skilled in the art that my invention may readily be embodied in machines for shaping glass other than those intended to form mold blanks.

In the sheets of drawings illustrating my invention and forming part of my specification.

In the several figures like numerals are used to designate like parts.

The movements of substantially all the movable parts of the machine is effected by means of fluid pressure, such as compressed air or steam, and my improvements, therefore, have to do with means for obtaining effectiveness and efficiency in the use of such power. As between compressed air and steam, the former is much more desirable for reasons well understood by those skilled in the art.

In describing the machine the several operating parts may be conveniently classed under three heads, first, those having to do with the shears; second, the movement of the table; and, third, the operation of the plunger. After describing the general construction of the machine, I will describe in detail the several said operating parts in the order named.

The complete machine is suitably mounted on a truck comprising wheels 1, stringers 2 and channel frames 3 and 4. Secured to the frame 3 there is a pedestal 5 upon which the blowing table 6, provided with molds 7, is rotatably mounted; and a blower 8 is secured to a central rod 9 in position to register with the molds 7 as they are brought beneath it. As stated heretofore, my improvements are not illustrated as applied to the blowing table, so that further description of it is unnecessary. Two pedestals 10 and 11 are secured to the frame 4; the former carries a rod 12, attached to and forming a partial support for the plunger cylinder 13; and the latter, as seen best in Fig. 11, sustains, through ball bearings 14, the rotatable mold table 15, and also a tubular post 16 attached to and forming a second support for the plunger cylinder 13. Through this cylinder the plunger rod 26 reciprocates. A plate 17 extends between and is secured to the frames 3 and 4, such plates forming a support for a pedestal 18 on which the table-moving cylinder 19 is rotatably mounted through ball bearings 20, as seen particularly in Fig. 10. A plate 22 is secured to the post 16 and forms a support for the shears 27, their operating cylinder 33 and the primary valve 36.

Such being the general structural arrangement of the machine, in its general operation a quantity of molten glass is fed to the mold 25 beneath the shears 27, which are caused to cut the glass from the gathering tool; the operation of which shears becomes effective to control the air to cause the table-turning-mechanism, including the cylinder 19, to advance the table one station, so that the filled mold stands beneath the plunger; and the operation of the table-moving means in turn sets the plunger-moving means, including the cylinder 13 and plunger rod 26, in operation.

Figure 1:
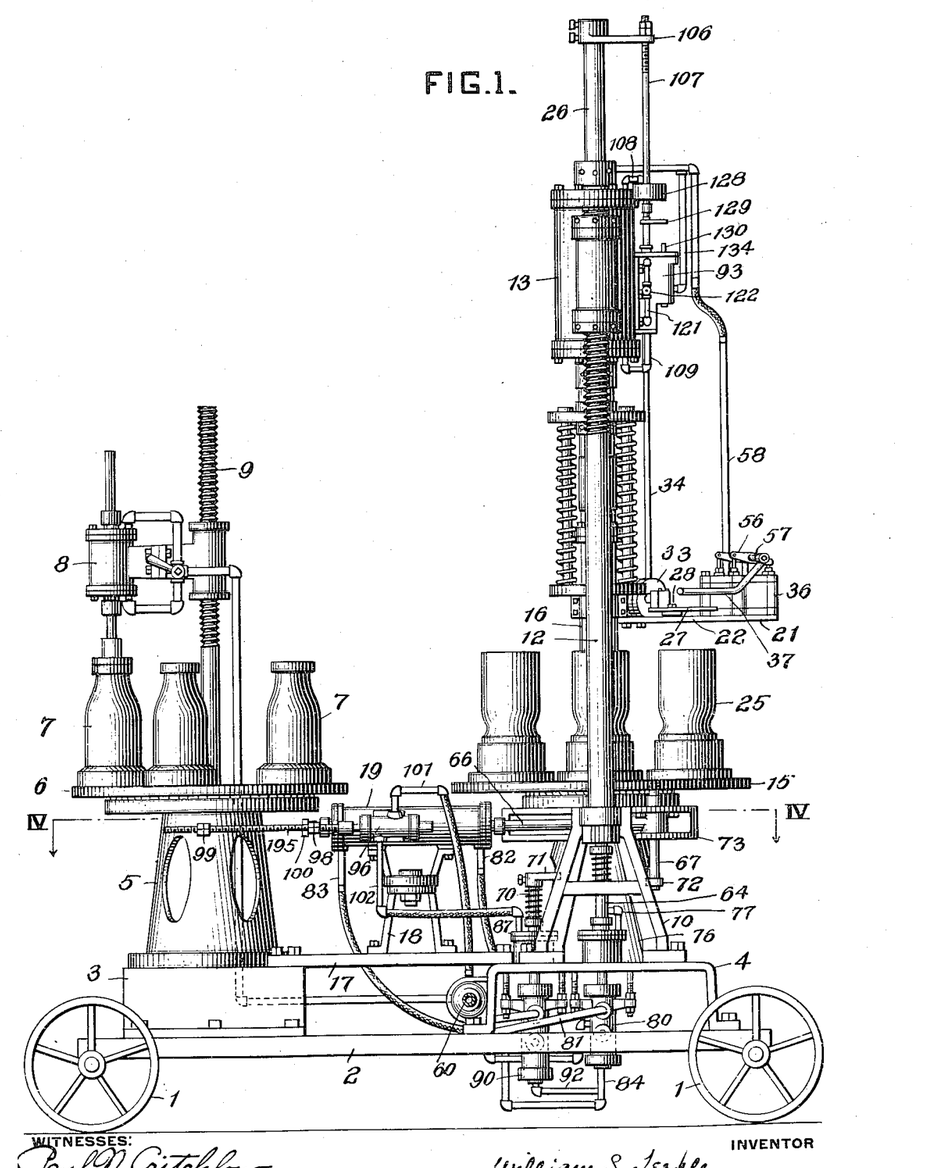
Figure 1 is an elevation of the complete machine.
Figure 3:
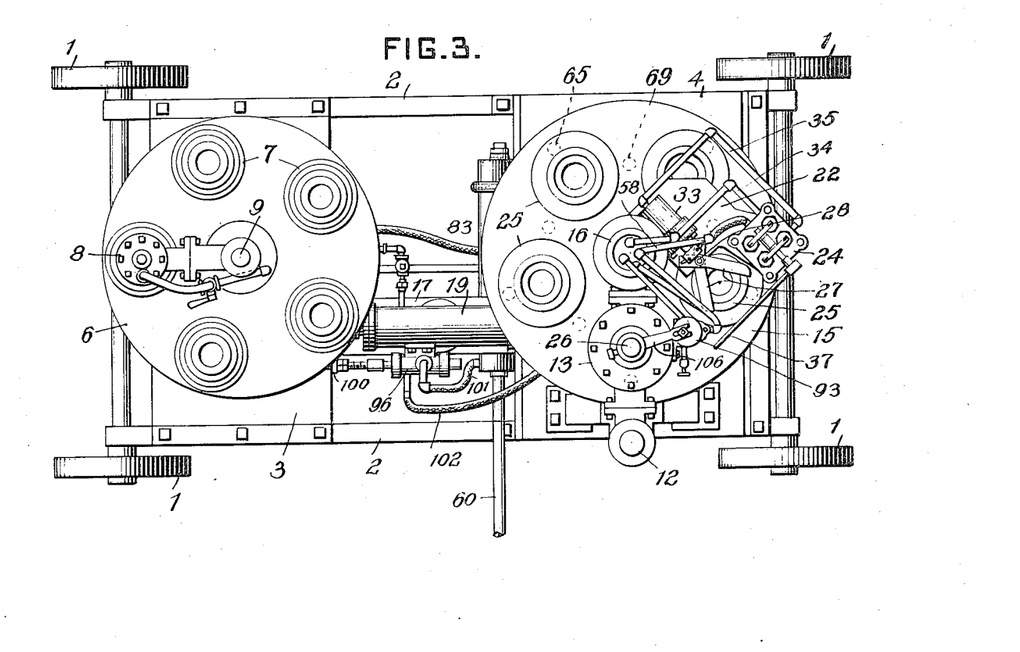
Fig. 3 a plan view of the machine.
Figure 4:
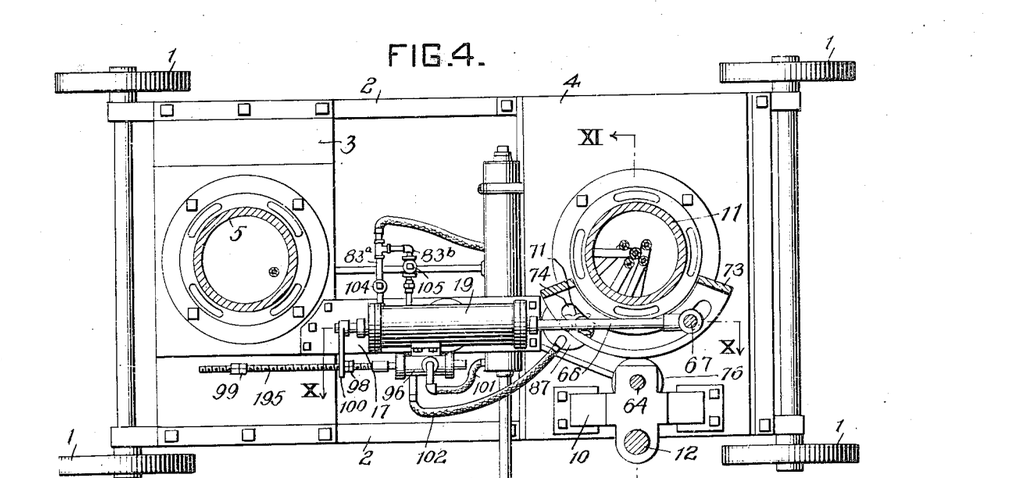
Fig. 4 a sectional plan view taken on the broken line IV—IV, Fig. 1.
Figure 5:
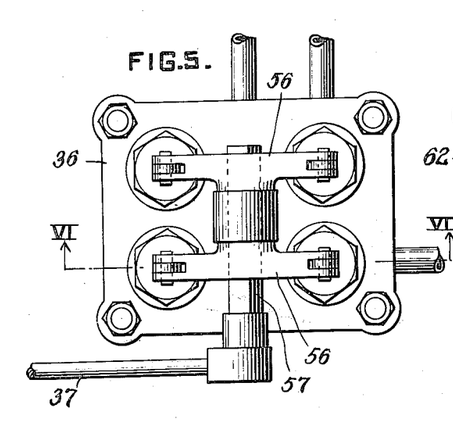
Fig. 5 a detail plan view to enlarged scale of the primary compound valve.
Figure 6:
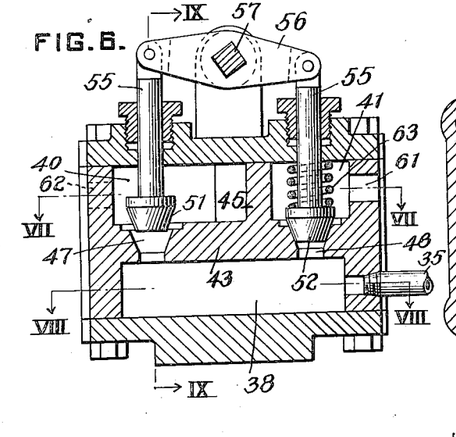
Fig. 6 a sectional view taken on the line VI—VI, Fig. 5.
Figure 7:
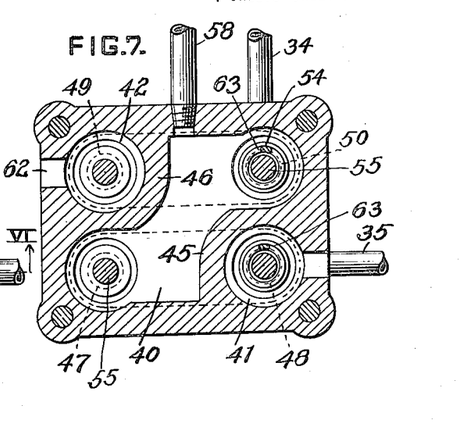
Figs. 7, 8, and 9 are sectional views taken, respectively, on the lines VII—VII, VIII—VIII and IX—IX of Fig. 6.
Figure 8:
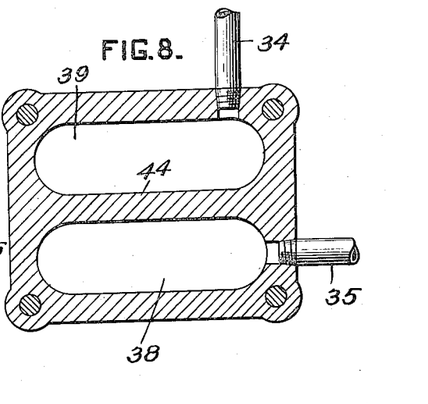
Figure 9:
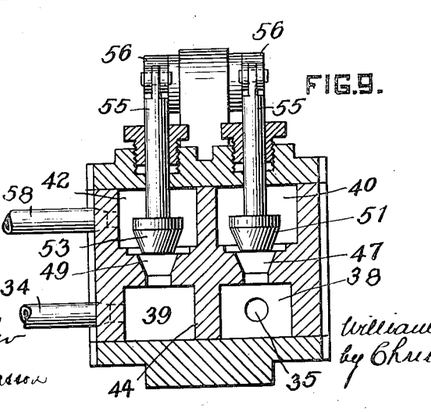
Figure 15:
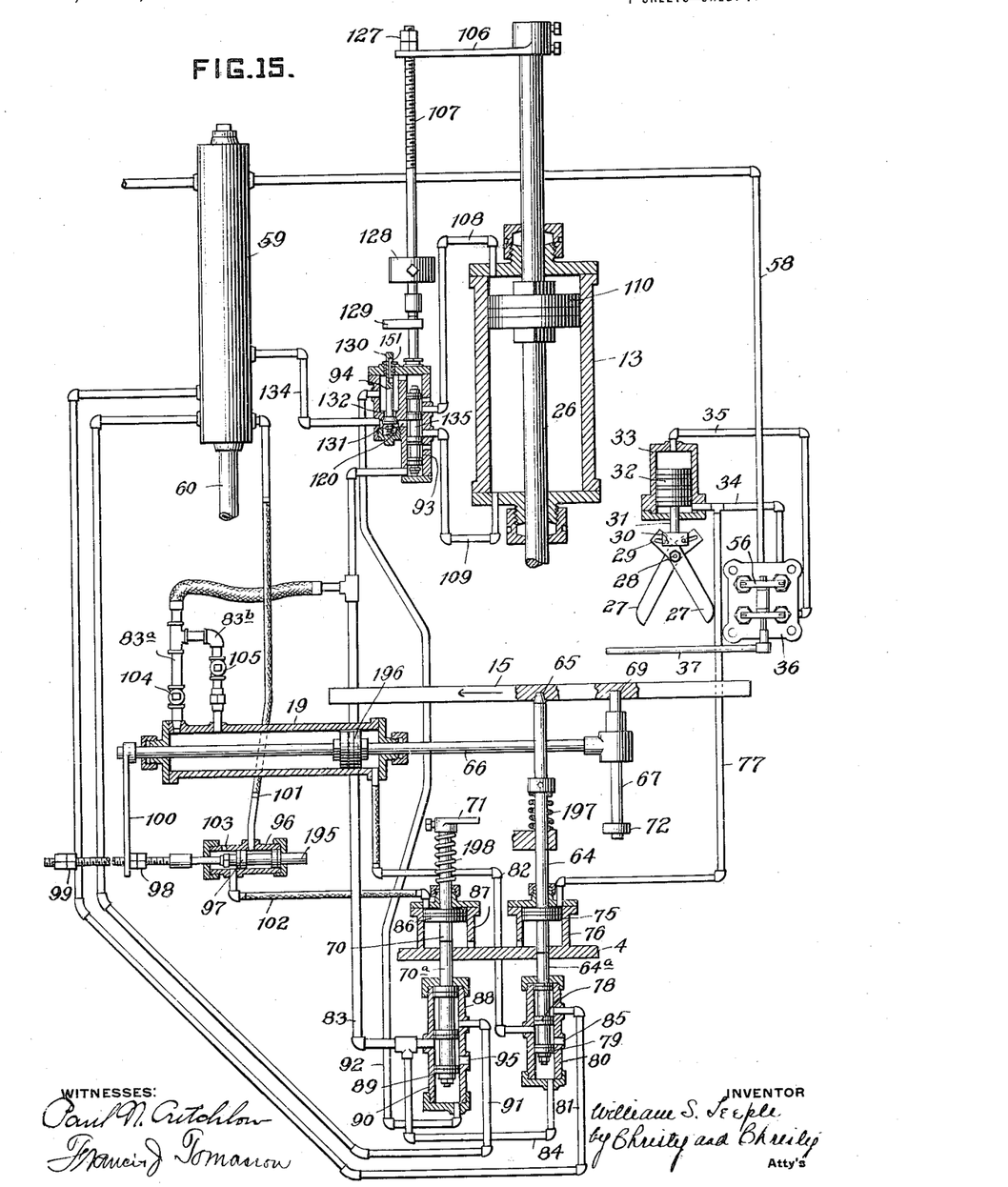
Fig. 15 is a diagrammatic representation of all the movable parts, sectional views of the valves for operating them, and the complete pipe connections between the several valves, the positions of the operating parts and valves being that immediately preceding the setting in operation of the shears.

Referring now to the shears and their operating mechanism, the preferred form is illustrated best in Figs. 1, 3 and 15. The shears comprise two blades 27, pivoted to each other and to the plate 22 as at 28, the rear ends of the blades being provided with slots 29 which are engaged by pins 30 secured to the end of the piston rod 31. A piston head 32, connected to the rod 31, is caused to reciprocate through the cylinder 33 by air led therein through pipes 34 and 35, each connected to the primary valve 36, which valve is preferably secured to the plate 22 in such a position that its controlling lever 37 lies in front of the shears 27. When glass is fed to the molds the gatherer may then depress the lever with his gathering tool and thus cause the shears to operate.

The construction of the valve 36, which is shown in detail in Figs. 5, 6, 7, 8 and 9; is such as to reduce to a minimum the air loss in operating the shears, and further such as to control the air for starting the table moving mechanism in operation. The valve casing is divided into five chambers 38, 39, 40, 41 and 42 by means of a horizontal partition 43, a vertical partition 44 extending downwardly from said horizontal partition, and two semi-circular partitions 45 and 46 extending upwardly from the horizontal partition. Ports 47, 48, 49 and 50 extend through the horizontal partition 43 in the positions shown, and valve plugs 51, 52, 53 and 54 form closures for such ports in the order named. Each plug is secured to a stem 55, which in turn are pivoted to rocking beams 56 borne by a rock shaft 57 to which the operating lever 37 is secured. The pipe 34 extends into the lower valve-chamber 39, pipe 35 into lower chamber 38, and a pipe 58 into the upper chamber 40, the pipe 58 leading from the manifold 59, which is secured to the frame 4, and which is supplied with compressed air through pipe 60 from any suitable source. The further details of construction comprises escape openings 61 and 62 from the chambers 41 and 42, respectively, and compression springs 63 on the stems 55 to which plugs 52 and 54 are secured, the arrangement of the springs being such as to keep these plugs normally in closed valve position. As will be readily seen the valves operate in pairs, the ports 48 and 50 being closed when the ports 47 and 49 are open, and the latter being closed when the former are open.

In the operation of the valve, the several parts are normally in the positions indicated in the drawings. In such position air under pressure acts upon the rear of the piston 32, while the front thereof is open to atmospheric pressure. The compressed air line of communication from the manifold 59 to the rear of the piston is through pipe 58, chamber 40, port 47, chamber 38, and pipe 35. The front of the piston is open to the atmosphere through pipe 34, chamber 39, port 49, chamber 42, and openings 62. After sufficient glass is in the mold the gatherer depresses the operating lever 37 by means of his gathering tool, and holds such lever down until the molten glass is severed by the shears 27. While the valves are in this alternate position, the pressure in the cylinder 33 is reversed to that just described. The air flows from the manifold through pipe 58, chamber 40, port 50, chamber 39 and pipe 34; while the rear of the piston is open to the atmosphere through pipe 35, chamber 38, port 48, chamber 41 and opening 61. Thus it will be seen that the piston will be moved and the glass cut from the gathering tool, which, when it is removed permits the movable valve members, through the action of the springs 63, to return to their normal position, changing the air in the cylinder 33 and opening the shears 27.

Figure 10:
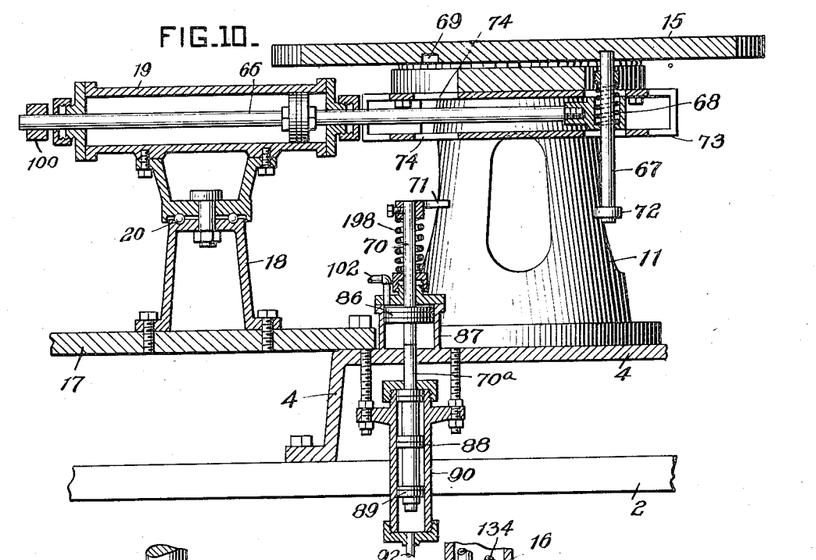
Fig. 10 is a longitudinal sectional view to enlarged scale taken on the line X—X, Fig. 4.
Figure 11:
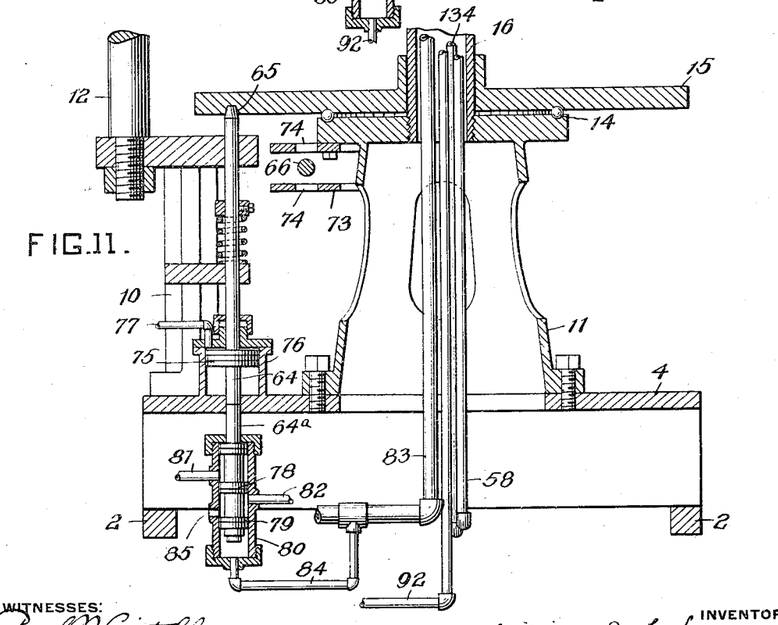
Fig. 11 a transverse sectional view to the scale of Fig. 10, taken on the line XI—XI, Fig. 4.
Figures 12, 13, 14:
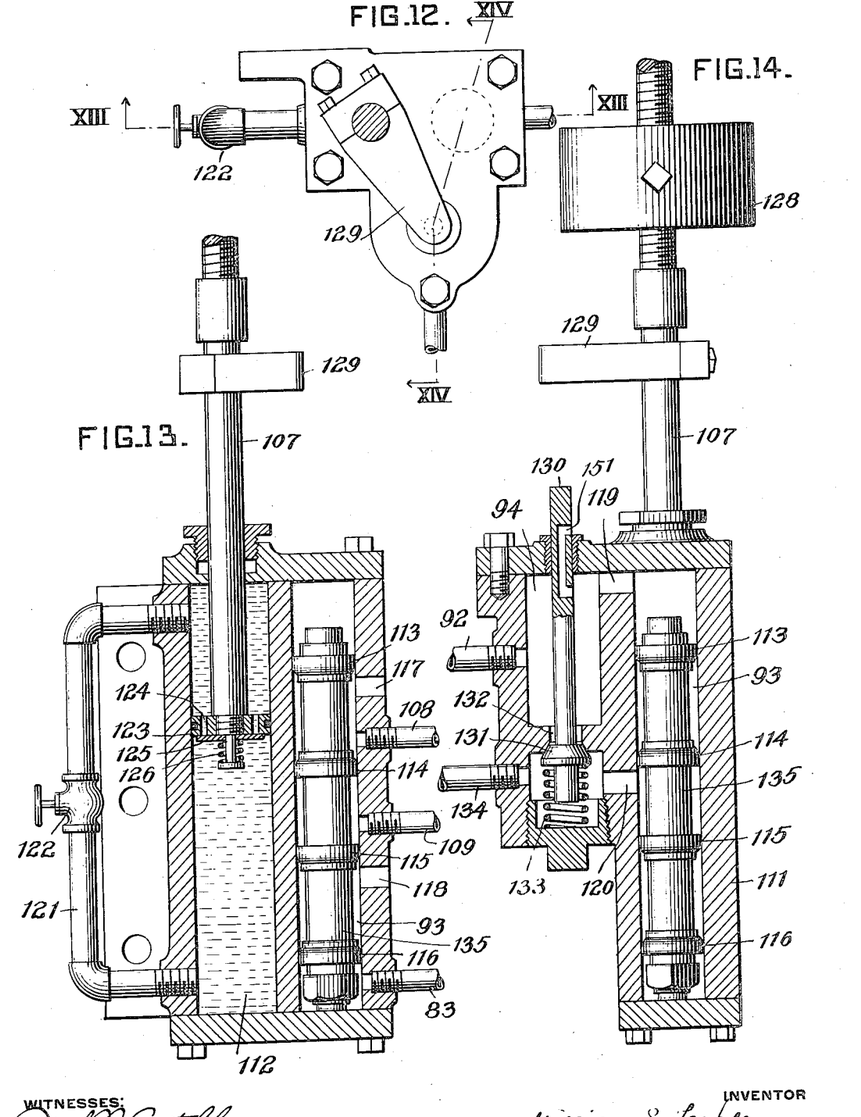
Fig. 12 a top plan view to enlarged scale of the plunger-controlling and timing valve.
Figs. 13 and 14 are sectional views taken, respectively, on the lines XIII—XIII and XIV—XIV, Fig. 12.

Referring now to the table-moving means, which are illustrated particularly in Figs. 10, 11 and 15, I provide a divided locking rod 64—64ª, the upper end of which is adapted to extend into one of a plurality of suitable holes 65 in the lower side of the table 15; and a reciprocatory rod 66, adapted to move through the rotatable cylinders 19, and provided on its outer end with a table-engaging pin 67 held yieldingly in upward position by means of a spring 68, and adapted when in such position to extend into one of a second series of holes 69 in the lower side of the table 15. A third divided rod 70—70ª is provided in order to release the pin 67 from the table, and to such end the rod portion 70 has a finger 71 secured to its upper end in position to extend over a finger 72 secured to the lower end of the pin 67. The pedestal 11 carries a guide frame 73 provided with an arc-shaped slot 74 through which the pin 67 extends. As will be readily seen the guide frame 73 supports the outer end of the rod 66, and determines the path of movement of the pin 67, such path being an arc of a circle concentric with the table 15.

The reciprocation of each of the rods 64—64ª, 66 and 70—70ª is effected by compressed air, and their movements are utilized to control the subsequent flow of the air and thereby effect a simultaneous operation of the moving parts of the machine. The rod portion 64 is provided with a piston head 75 movable through a cylinder 76 secured to the frame 4, and which is connected with the pipe 34 by means of a pipe 77. The rod 64ª forms the movable stem of a plunger valve, and to such end is provided with valve collars 78 and 79 adapted to bear yieldingly against the wall of a casing 80. This casing is connected to the manifold 59 by pipe 81, to the cylinder 19 by pipe 82, and to a pipe 83 by pipe 84. The casing is also provided with an outlet port 85, all of the parts being in the relative positions clearly shown in Fig. 15. The operation and function of this locking rod valve will be explained in the description of the full operation of the machine.

The divided release rod 70—70ª is similarly operated, and the portion 70ª is provided with a like plunger valve at its lower end. A piston head 86 is secured to the rod 70 and moves through a cylinder 87 secured to the frame 4; and the lower end of the rod 70ª is provided with valve collars 88 and 89, movable through a casing 90 to which pipes 83, 91 and 92 are connected. These pipes extend respectively to the cylinder 19 and timing valve chamber 93, manifold 59, and timing valve chamber 94. The casing 90 is also provided with an outlet port 95 open to atmospheric pressure. The rods 64 and 70 are held yieldingly upward by springs 197 and 198, respectively.

The plunger valve, operated by the reciprocation of the table-moving rod 66 and its piston 196, comprises a casing 96, secured to the cylinder 19, and through which a stem 195 is adapted to move longitudinally. This stem is provided with a single valve collar 97, and is threaded at its outer end to receive locked nuts 98 and 99 forming engaging abutments for the arm 100, which is rigidly secured to the rod 66. The valve casing 96 is connected by means of pipes 101 and 102 to the manifold 59 and cylinder 87, respectively, and is provided with an outlet port 103. The line of communication between the outer end of the cylinder 19 and the pipe 83 is effected by two pipes 83ª and 83ᵇ, the former having a check valve 104 permitting only the flow of air into the cylinder 19, and the latter having a check valve 105 permitting only the escape of the air therefrom.

Figure 2:
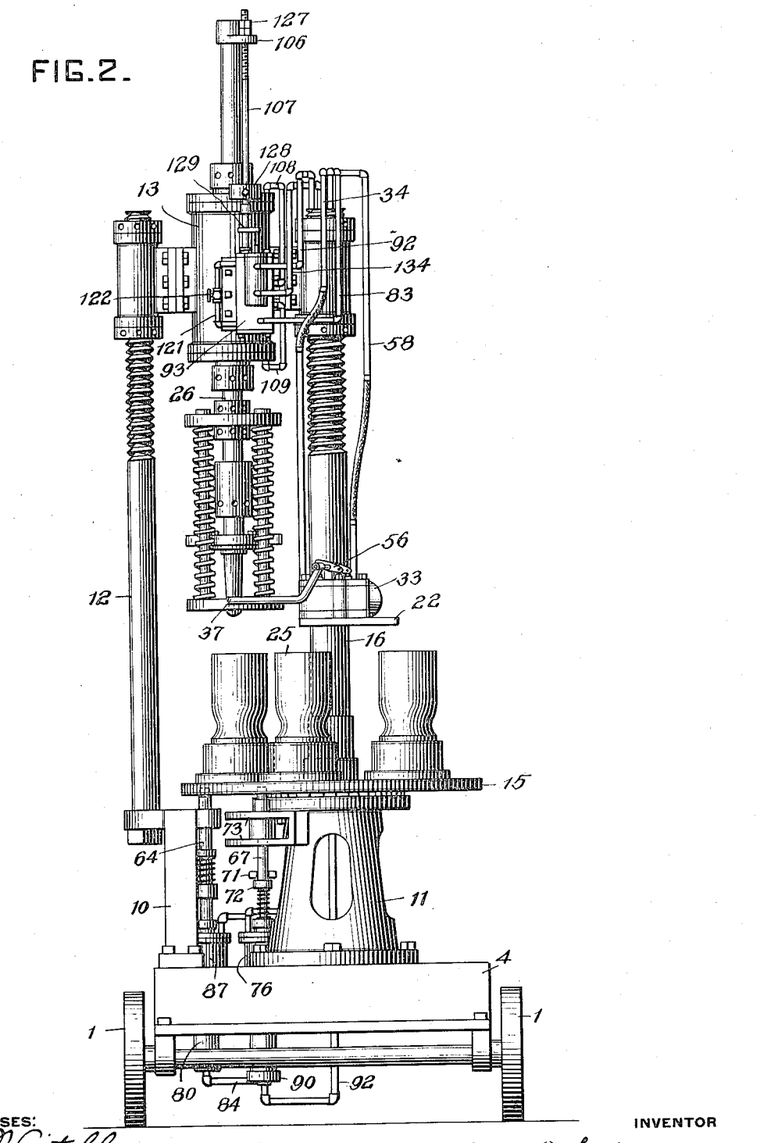
Fig. 2 an elevation looking to the right of the machine as shown in Fig. 1.

Before describing the operation of the table-moving mechanism, I will describe the construction of those parts of my machine having to do with the third step in its operation, namely, the movement of the plunger rod 26. The glass-forming end of the plunger rod may, as stated heretofore, be of any construction suitable for the intended purpose, that shown herein being adapted to form a blank to be subsequently blown into a bottle. Referring to Figs. 1, 2 and 15, the plunger rod 26, having a piston head 110 secured thereto, extends through the cylinder 13 and is provided at its upper end with an arm 106, adapted to engage a rod 107 forming one of the moving parts of a timing valve presently to be described. The cylinder 13 is connected at its opposite ends to the timing valve chamber 93 by means of pipes 108 and 109, the timing valve so controlling the flow of air through such pipes as to effect the proper reciprocation of the plunger rod 26.

The detail construction of the timing valve is best seen in Figs. 12, 13, 14 and 15, and as shown therein, comprises a casing 111 which incloses three chambers 93, 94 and 112. A longitudinally movable stem 135 is placed in the chamber 93, such stem being provided with four valve collars 113, 114, 115 and 116. The wall of the chamber 93 has two ports 117 and 118 opening to atmospheric pressure, and has two other ports 119 and 120 opening into the chamber 94. Also, this chamber is connected by pipes 83, 108 and 109, respectively, to the release valve casing 90, upper end of cylinder 13 and lower end thereof. The rod 107 moves through the chamber 112, which is filled with a suitable liquid such as oil, and which has a by-pass pipe 121 connecting the upper and lower portions thereof, such pipe being provided with a controlling valve 122. The lower end of the rod 107 is provided with a piston head 123, having holes 124 through it, which are normally closed by means of a disk 125 held yieldingly against the lower side of the head 123 by means of a spring 126. The upper end of the rod 107 carries an adjustable abutment 127 in the form of locked nuts adapted to be engaged by the arm 106 in the upward movement of the plunger rod 26, and a weight 128, secured to the rod 107, causes it to move downwardly after the plunger has been lowered and against the resistance of the liquid flowing through the by-pass 121 from the lower to the upper side of the head 124. The rod 107 also carries a finger 129 in a position to strike the top of a valve rod 130, which is provided with a valve plug 131 adapted to close the port 132 in the valve chamber 94. The rod 131 is held yieldingly in closed valve position by means of a spring 133. The valve chamber 94 is connected by means of pipes 92 and 134 to the valve casing 90 and manifold 59, respectively.

When the timing valve parts are in the positions shown in the drawings, live air acts against the lower side of the plunger piston 110, the line of communication from the manifold being through pipe 134, lower portion of valve chamber 94, port 120, the portion of the chamber 93 between valve collars 114 and 115, and pipe 109 to cylinder 13. The upper side of the piston 110 is then open to atmospheric pressure through pipe 108, the portion of the chamber 93 between the valve collars 113 and 114, and the port 117. After the stem 135 has been moved to its upper limit, in the manner hereinafter described, the air pressure in the cylinder 13 is reversed; the upper side of the piston 110 is then open to live air through pipe 108, which is then in communication with the above mentioned live air portion of the valve chamber 93 between the collars 114 and 115; and the lower side of the piston is open to atmospheric pressure through the pipe 109, portion of valve chamber 93 between collars 115 and 116 and the port 118. The flow of liquid through the by-pass 121 is so regulated that the plunger rod 26 moves downwardly more rapidly than the stem 107, which, when it reaches a predetermined point of its downward movement under the action of the weight 128, causes, through finger 129, the rod 130 to move downwardly, thereby opening the upper side of the stem 135 to compressed air and causing it to move to the position shown in the drawing, thus causing the plunger rod to rise. When the rod 130 is in lowered position, live air flows through the pipe 134, lower portion of chamber 94, port 132, upper chamber 94 and port 119. The rod 130 is provided with a by-pass 151 so constructed that, when the rod is in its upper or closed-valve position, the upper chamber 94 will be exposed to atmospheric pressure, but when lowered the upper end of the by-pass will be closed, thus preventing the escape of live air from the upper valve chamber 94.

It will be seen that, by such an arrangement, the plunger rod 26 is held in lowered position for a sufficient period to effect the desired forming of the glass. When the plunger rod 26 moves upwardly, the arm 106 engages the abutment 127 of the stem 107 and raises the stem through the chamber 112, the oil at the upper side of the piston 123 flowing through the holes 124 as well as through the by-pass 121.

The complete operation of the machine is as follows, assuming that the positions of the operating parts are as shown in Fig. 15: When the gatherer observes that a sufficient quantity of glass is in the mold, he depresses the valve lever 37, thus causing, in the manner heretofore fully described, the shears to sever the glass in the mold from that remaining on his gathering tool. While air flows through pipe 34 to the shear cylinder 33, it also flows through pipe 77 to the locking rod cylinder 76, and, acting on the piston 75, causes the locking rod 64—64ª to move downwardly, it being observed that the lower end of the rod portion 64ª is open to atmospheric pressure through pipe 84, pipe 83, valve casing 90 and port 95 therein. Following the simultaneous operation of the shears 27 and release of the table locking-rod 64—64ª, air is admitted to the forward end of the cylinder 19, the line of communication from the manifold 59 being through pipe 81, the portion of the chamber within the valve casing 80 above the lowered position of the collar 78, and pipe 82. The piston head 196 will then move through the cylinder 19 causing the table 15 to advance one station in the direction of the arrow placed thereon in Fig. 15, it being seen that the opposite side of the piston 196 is open to the atmosphere through pipe 83ᵇ, pipe 83, valve casing 90, and port 95. While the table is thus advancing, the gatherer removes his tool from the lever 37, permitting the primary valve 36, through the actions of the springs therein, to return to its original position, wherein the pipe 77 is thrown open to the atmosphere. The rod portion 64 will then rise by the action of the springs 197, leaving the portion 64ª in its lowered position. The end of the stroke of the piston rod 66 is cushioned by air confined in the end of the cylinder 19, it being understood that air cannot, on account of check valve 104, flow from the cylinder 19 through the pipe 83ª. The final stopping of the table, however, is effected by the end of the locking rod 64 slipping into the next hole 65. Just before the rod 66 reaches the end of its stroke, the arm 100, which is secured thereto, strikes the stop 99 of the rod 195, causing such rod to move through the valve casing 96. Live air then flows from the manifold 59 through pipe 101, valve casing 96 and pipe 102 to the cylinder 87, and causes the rod 70—70ª to move downwardly, the bottom of rod 70ª being open to the atmosphere through pipe 92, upper valve chamber 94, and by-pass 151 in rod 130. By this movement the finger 71 of rod 70 which then extends over the finger 72 of pin 67, releases the pin 67 from the hole 69; and, in the new position of the rod 70ª, live air flows from the manifold through pipe 91, upper portion of cylinder casing 90, pipe 83, and pipe 83ª to the rear side of the piston 196. At the same time, live air also flows from pipe 83 through pipe 84 to the bottom of the valve casing 80, thereby moving the rod 64ª to its upper position, wherein the front end of the cylinder 19 is thrown to atmospheric pressure through pipe 82 valve casing 80 and port 85. The rod 66 then moves to its forward position, and as it approaches the end of its stroke the arm 100 engages the stop 98 of the rod 195 and causes such rod to move to its shown position, wherein the cylinder 87 is again thrown open to the atmosphere through pipe 102, valve casing 96 and port 103 therein. At the same time air flows to the rear of the piston 196 and causes it to return to its shown position, air also flows through pipe 83 to the bottom of the timing valve chamber 93 and moves the stem 135 to its upper position, the air above such stem escaping through port 119, upper valve chamber 94 and by-pass 151. The operation of the timing valve, when thus set in motion by the movement of the stem 135, has been fully explained following the detailed description thereof. It remains only to be stated that, when the end of the rod 130 is struck by the finger 129 of the stem 107, live air flows from the lower part of the timing valve chamber 94 through port 132 to the upper part thereof, and thence through pipe 92 to the lower part of the valve casing 90, causing the rod 70ª to rise to its shown position.

1. In a glass-forming machine, the combination of a rotatable table, means for moving said table intermittently, a fluid-pressure glass-cutter, a reciprocatory rod for locking said table, fluid pressure means for moving said rod, a single valve for controlling the operation of said cutter and the reciprocation of said rod, and means operated by the reciprocation of said locking rod for setting said table-moving means in operation.

2. In a glass-forming machine, the combination of a rotatable table, means for moving said table intermittently, a fluid pressure glass cutter, a reciprocatory rod for locking said table, fluid pressure means for moving said rod, a single valve for controlling the operation of said cutter and the reciprocation of said rod, valve collars secured to said rod, a valve casing inclosing said collars, and pipes connecting through said casing a source of fluid supply to said table moving means, whereby the reciprocation of said locking rod becomes effective to set said table moving means in operation.

3. In a glass-forming machine, the combination of a rotatable table, means for moving said table intermittently, fluid-pressure actuated shears for cutting glass, fluid-pressure actuated table locking mechanism, a single valve for controlling the operation of said shears and mechanism, and means operated by the movement of the locking mechanism for setting said table moving means in operation.

4. In a glass-forming machine, the combination of a rotatable table, means for moving said table intermittently, shears for cutting glass, fluid-pressure means for operating said shears, a reciprocatory rod for locking said table, fluid-pressure means for moving said rod, a single two-position valve effective in one position to permit a flow of motive fluid to said shear-operating and rod-moving means and in the other position to afford an outlet for the fluid previously let to said two means, and means rendered effective after the release of said locking rod for setting said table-moving means in operation.

5. In a glass-forming machine, the combination of a rotatable table, means for moving said table intermittently, glass-cutting shears, fluid-pressure means for operating said shears and including a cylinder and a piston head, table-locking mechanism, fluid-pressure means for operating said mechanism, a two-position valve effective in its alternate positions to permit the flow of fluid to and afford paths of escape of fluid from the opposite ends of said shear cylinder and furthermore to permit the flow of fluid to and afford a path of escape from said lock-operating mechanism, and means rendered effective after the release of said locking mechanism for setting said table-moving means in operation.

6. In a glass-forming machine, the combination of a rotatable table, means for moving said table intermittently, and a two-part rod one part thereof being adapted to lock said table and held yieldingly against the lower surface thereof, the other part of said rod forming a valve stem and surrounded by a valve casing, said stem and casing controlling a supply of fluid to said table moving means.

7. In a glass-forming machine operated by fluid pressure, the combination of a rotatable table, a reciprocating locking rod, a reciprocating table-moving rod, a reciprocating release rod, and a reciprocating plunger, means operated by said locking rod for controlling fluid supply to said table-moving rod, means operated by said table-moving rod for controlling fluid supply to said release rod, and means operated by said release rod for controlling fluid supply to said plunger.

8. In a glass-forming machine operated by fluid pressure, the combination of an intermittently rotatable table, a reciprocating locking rod, a reciprocating table-moving rod, a reciprocating release rod, and a reciprocating plunger, a valve formed on the end of said locking rod for controlling fluid supply to said table-moving rod, a valve operated by the movement of said table-moving rod for controlling fluid supply to said release rod, and a valve formed on the end of said release rod for controlling fluid supply to said plunger.

9. In a glass-forming machine operated by fluid pressure, the combination of a rotatable table, locking mechanism therefor, a reciprocating table-moving rod adapted to operatively engage the table, means for releasing said rod from the table, a reciprocating plunger, means operated by said locking mechanism for controlling fluid supply to said table-moving rod, means operated by the table-moving rod for controlling fluid supply to said rod-releasing mechanism, and means operated by said rod-releasing mechanism for controlling fluid supply to said plunger.

In testimony whereof I have hereunto set my hand.

WILLIAM S. TEEPLE.

Witnesses:
J. HERBERT BRADLEY,
PAUL M. CRITCHLOW.